(12) United States Patent
Varma

(10) Patent No.: US 8,144,860 B1
(45) Date of Patent: Mar. 27, 2012

(54) METHOD AND APPARATUS PROVIDING REMOTE END INPUT VALIDATION

(75) Inventor: Deepak Varma, Cybercity Magarpatta (IN)

(73) Assignee: Avaya Inc., Basking Ridge, NJ (US)

( * ) Notice: Subject to any disclaimer, the term of this patent is extended or adjusted under 35 U.S.C. 154(b) by 1216 days.

(21) Appl. No.: 11/862,506

(22) Filed: Sep. 27, 2007

(51) Int. Cl.
*H04M 3/00* (2006.01)
*H04M 7/00* (2006.01)

(52) U.S. Cl. ............................. 379/265.02; 379/221.11

(58) Field of Classification Search ............. 379/265.04, 379/221.11, 265.02
See application file for complete search history.

*Primary Examiner* — Rasha Al Aubaidi
(74) *Attorney, Agent, or Firm* — Chapin IP Law, LLC

(57) ABSTRACT

A method, apparatus and computer program product for providing remote end input validation is presented. A communication is sent to an IVR from a remote end device. The IVR responds by sending a Request Voice Data Capsule (request VDC) to the remote end device. The remote end device receives the Request Voice Data Capsule (request VDC) from the IVR and executes a contained in the remote VDC. The remote end communications device validates user inputs utilizing a resource associated with said remote end communications device and sends a Response Voice Data Capsule (response VDC) including at least one validated communication to the IVR. The IVR processes the response VDC.

20 Claims, 4 Drawing Sheets

METHOD AND APPARATUS PROVIDING REMOTE END INPUT VALIDATION

BACKGROUND

Contact centers are systems in which a person can communicate to deliver and receive information. A contact center typically includes one or more interactive voice response (IVR) systems. The one or more IVRs provide automatic branching voice queries to which the caller responds with button pushes on a telephone keypad or with voice responses on a telephone.

The IVR system includes an IVR engine to provide the telephony features and other caller services. The IVR engine may also engage various other entities such as a Speech Recognition Server (SRS) to perform the validation of the user data, and a Text-To-Speech (TTS) server to perform text-to-speech conversion. The communication between the IVR system and the remote end communications device (e.g., a cellular telephone) happens over an Audio Path and the communication between the IVR system and the other entities happen generally over a network such as TCP/IP.

SUMMARY

Conventional mechanisms such as those explained above suffer from a variety of deficiencies. One such deficiency is that customers spend more time on a call since for every single input, the IVR is dependent upon the SRS. Additionally, the IVR needs to communicate multiple times with the SRS to get a valid user input. Further, the whole IVR system has a high risk of "Full time" availability of the SRS. Another deficiency associated with conventional IVR systems is in order to meet the load/peak conditions, contact centers needs to purchase a higher number of SRS licenses/ports to ensure that the caller input is not waiting for availability of the SRS. Additionally, the IVR port or communication path is blocked until either the remote end or IVR system drops the call. Further still, in most of the cases, the administration of the SRS is complex and requires a skilled person to manage it.

An example of an IVR system may be one wherein a customer is communicating with a pizza ordering IVR application. The customer calls a telephone number of the pizza shop and is placed in communication with a pizza delivery order IVR. The customer may hear the following prompt "Please say if you wish to order a SMALL, MEDIUM, or LARGE pizza".

Then the customer inputs a valid selection (e.g., by stating LARGE). The customer input (LARGE in this case) is sent to IVR system over the audio path. The IVR then engages a SRS and requests the input be validated. The SRS would do the speech processing and would return a success and a match that the IVR would map as LARGE. The IVR then plays another prompt e.g., "I heard you say LARGE. If this is correct, say YES or say NO to go to the previous menu" to the caller to confirm the input. When the caller says "YES" the input is again carried to the SRS for validity and on receiving success, the IVR then performs the next step of the pizza order application.

The above scenario describes a basic and common exchange between a caller and the IVR application. In order to validate a single user input [LARGE], the IVR needs to make multiple iterations/communications with the SRS.

Embodiments of the invention significantly overcome such deficiencies and provide mechanisms and techniques that provide remote end input validation. Embodiments of the method and apparatus providing remote end input validation propagate the use of distributed speech recognition capabilities on the remote end communication devices to enhance user input validation. Thus the validation can be performed at the remote end device, freeing up bandwidth and resources on the IVR.

In a particular embodiment of a method for providing remote end input validation, the method includes receiving, at an IVR, a communication from a remote end communications device. The method further includes, in response to the receiving, sending a Request Voice Data Capsule (request VDC) to the remote end communications device. The method additionally includes receiving a Response Voice Data Capsule (response VDC), the response VDC including at least one validated communication from the remote end communications device.

In another particular embodiment of a method for providing remote end input validation, the method includes sending, from a remote end communications device, a communication to an IVR. The method also includes receiving at the remote end communications device, a Request Voice Data Capsule (request VDC) from the IVR and executing a script contained in the remote VDC. Further still, the method includes validating inputs from a user at the remote end communications device utilizing a resource associated with the remote end communications device and sending a Response Voice Data Capsule (response VDC) including at least one validated communication to the IVR.

Other embodiments include a computer readable medium having computer readable code thereon for providing remote end input validation. The computer readable medium includes instructions for receiving, at an IVR, a communication from a remote end communications device. The computer readable medium further includes, instructions wherein in response to the receiving, sending a Request Voice Data Capsule (request VDC) to the remote end communications device. The computer readable medium additionally includes instructions for receiving a Response Voice Data Capsule (response VDC), the response VDC including at least one validated communication from the remote end communications device.

In another particular embodiment a computer readable medium having computer readable code thereon for providing remote end input validation includes instructions for sending, from a remote end communications device, a communication to an IVR. The computer readable medium also includes instructions for receiving at the remote end communications device, a Request Voice Data Capsule (request VDC) from the IVR and instructions for executing a script contained in the remote VDC. Further still, the computer readable medium includes instructions for validating inputs from a user at the remote end communications device utilizing a resource associated with the remote end communications device and instructions for sending a Response Voice Data Capsule (response VDC) including at least one validated communication to the IVR.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides remote end input validation as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing remote end input validation as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Lincroft, N.J.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
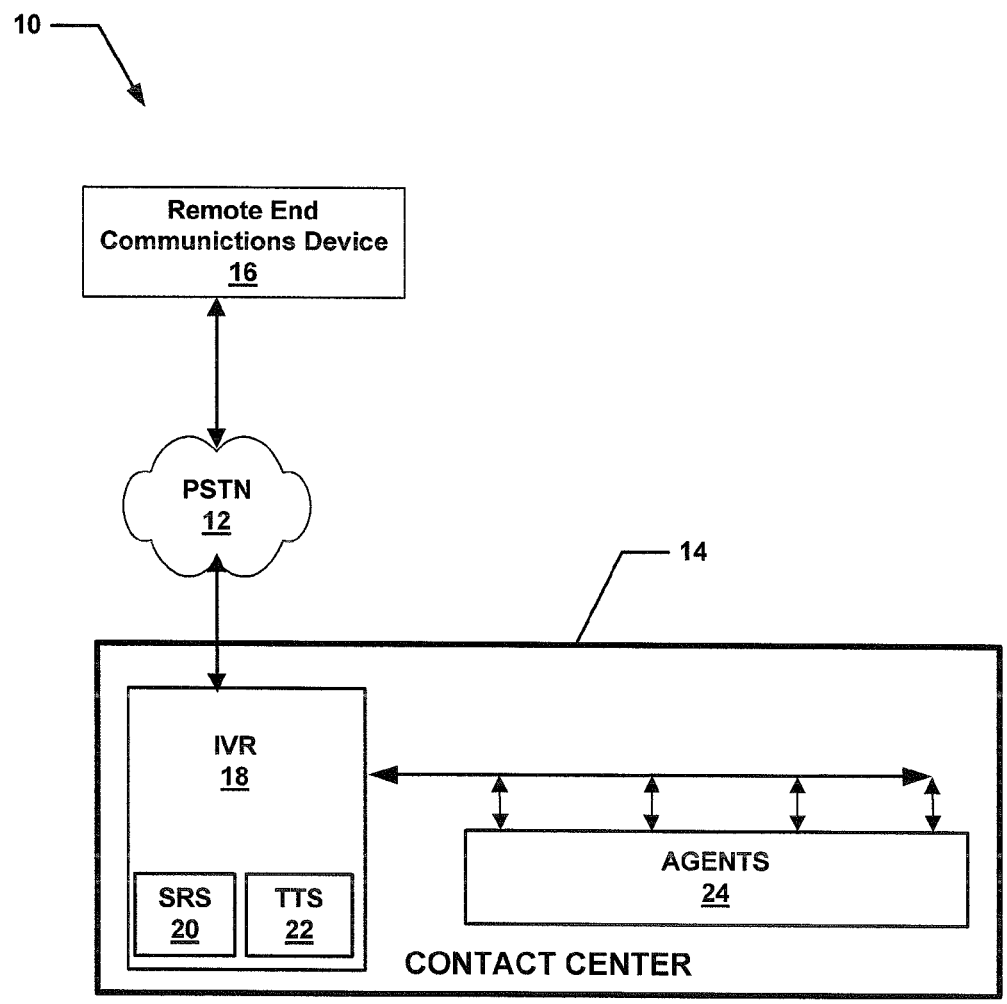
FIG. 1 depicts an example IVR system in accordance with embodiments of the present invention.
Figure 2:
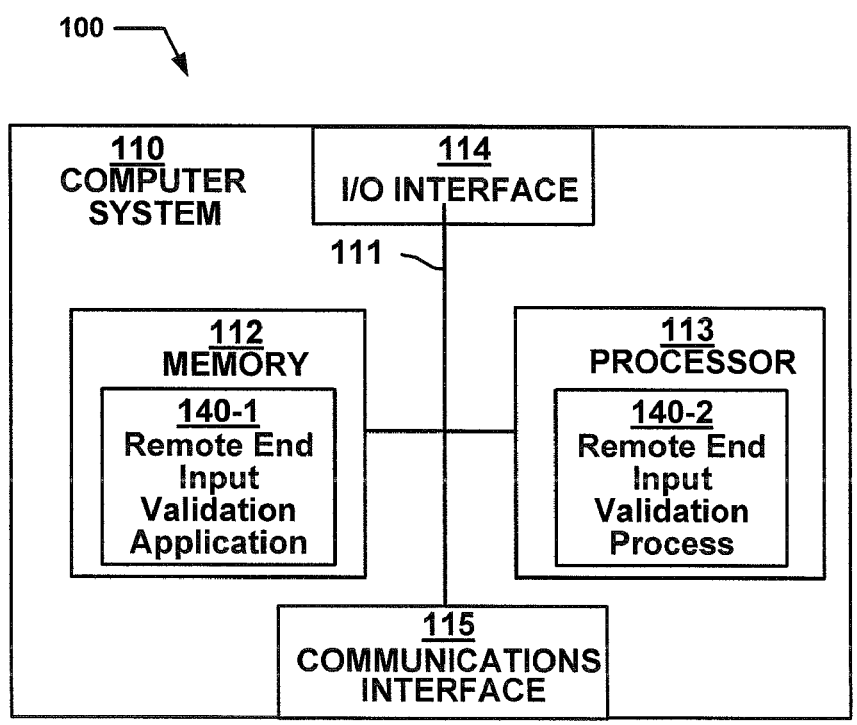
FIG. 2 illustrates an example computer system architecture for a computer system that performs remote end input validation in accordance with embodiments of the invention.

Referring now to FIG. 1, a particular embodiment of an IVR environment 10 is shown. The IVR environment 10 includes a contact center 14 connected to the public switched telephone network 12 (PSTN). The PSTN 12 is the worldwide telephone system that provides telephone call connections, including telephone connections to the contact center 14. The contact center 14 can be coupled to one or more interactive voice response systems (IVRs) 18 that provide voice queries to a telephone caller. The voice queries typically direct the telephone caller through a series of selections that can be chosen by the telephone caller via button pushes on the telephone keypad or spoken responses. The IVR may also include one or more SRSs 20 and one or more TTSs 22. Within the IVR queries, the telephone caller can be directed by the IVR 18 to select an option that connects the telephone caller to one of a group of agents 24.

By way of embodiments of the present method and apparatus providing remote end input validation, a protocol is provided to conduct the user input validation at the user end device itself. The protocol is based on a vision of a remote end communication device (e.g., a cellular telephone) with a built-in speech recognition capability. Currently many mobile phone manufacturers provide a speech recognition feature on the cellular phones.

The protocol operates on the usage of paradigms such as generic markup languages (XML, VXML or SOAP). A VXML dialog transaction is assumed to a logical set of one transaction or one step in the overall application. The presently disclosed protocol includes a plurality of components. These components include Remote End Input Verification (REIV) stacks on the IVR side, REIV Protocol carrier for Request Voice Data Capsule and Response Voice Data Capsule exchange, the Request Voice Data Capsule, the Response Voice Data Capsule, and the REIV stack on the remote end.

The Remote End Input Verification (REIV) stacks on the IVR side are similar to a TCP/IP stack for the network cards. The REIV stack is responsible for several functions. These functions include interpreting the IVR application dialogues (VXML dialogues/pages), building the request Voice Data Capsules (VDCs), sending the request VDCs to the remote end device, interpreting the response VDC received form the remote end device, and communicating the user input back to IVR.

The REIV protocol carrier for Request Voice Data Capsule and Response Voice Data Capsule exchange replaces the normal audio path of communication between the caller communication device and the IVR systems. The REIV protocol carrier provides a means over which the VDCs can flow either ways, the Request Voice Data Capsule from the IVR to the remote end device and the Response Voice Data Capsule from the remote end device to the IVR. In one embodiment one or more of the request VDC and the response VDC can be encrypted/decrypted to ensure data security.

The request Voice Data Capsule is similar to an IP data packet that flows over the TCP protocol. The request Voice Data Capsule includes several sections. A script section has Input Validation Language Scripts (IV scripts) that define the actions to be executed on the remote end. A prompt section includes prompts to be played at the remote end. A validation data section includes the possible valid user inputs (both voice and Dual Tone Multi Frequency (DTMF)), which the remote end will check without having to contact the IVR.

The Response Voice Data Capsule includes a section called a response section that contains the response back to IVR. The intent of this Response Voice Data Capsule response section is to convey the resultant "validated" input back to the IVR. The Response Voice Data Capsule may also be used to return value(s) or a recorded prompt(s).

The REIV stack on the remote end receives the request VDCs from the IVR systems and processes the IV scripts from the request VDCs. The REIV stack on the remote end also uses the remote end resource (such as a speaker) to play the prompts from the prompt section of the request VDC and may also use the remote end resource (such as a recorder) to record the prompts. The REIV stack also engages the remote end resource (such as a Speech Recognition unit) to synthesize the user input and measure it against the Valid Data sample in the Validation Data section.

One embodiment of the method and apparatus providing remote end input validation will now be described. Utilizing a similar application as the "Pizza Order" application discussed earlier, the process flow would be as follows:

1. The REIV stack on the IVR side builds a request VDC after processing the VXML page. The request VDC includes IV scripts that direct the remote end with what prompts to play, for example:

prompt 1—"Please say if you wish to order a SMALL, MEDIUM, or LARGE PIZZA"

prompt2: "I heard you said $VARIABLE$. Is this Correct. Say YES or NO" prompt3: "That was an invalid response" and prompt4: "Ok placing order for a $VARIABLE$ pizza".

The REIV stack on the IVR side also communicates with the remote end REIV stack. Just before the prompt has started playing, the script would also request for the Speech Recognition resource initialization so that the customer need have to wait to listen to the complete prompt. If a valid match is found, the remote end REIV stack would return success [match stored in $VARIABLE$] to the script. The script would then decide what prompt to play next (e.g., "I heard you say . . . " or "Ordering one"). The REIV stack on the IVR side would also have code to request the remote end REIV stack to communicate the status and data of the current transaction back to the IVR system. The REIV stack on the IVR side further determines which actions to take next. For example, if the user provides in incorrect input, the script would do a <play_error_prompt>+<repeat last prompt once more>.

The prompt section includes the prompts to be played. This would include a prompt that indicates an error in validation of the user input. For example, if the user says "BIG" instead of SMALL/MEDIUM/LARGE, there won't be a match for this input. In such a situation, an error prompt "I did not understand that" could be played.

The validation data section in this example would have "SMALL, MEDIUM, LARGE, YES, NO, YA, YEAH, YUP, YE" for matching the user input. It may also contain the response to be sent back to IVR such as SUCCESS, BACK, 1, 0, 1, 2, 3 etc indicating success, go to last transaction or main menu, YES, NO, SMALL, MEDIUM, LARGE etc.

2. After this request VDC is build, the IVR side REIV stack would send this to the remote end REIV stack. The entire request VDC can be broken into small packets and sent sequentially to the remote end.

3. The remote end REIV stack, which was waiting for the request VDC packets, would assemble the packets on the remote end and once the entire request VDC is built, it would start processing the IV script.

4. The script would request the REIV to play prompt1 i.e. "Please say which pizza size you wish to order SMALL, MEDIUM or LARGE".

5. The remote end REIV would first initialize the local Speech Recognition Unit (SRU) and engage the local speaker to play the requested prompt.

6. On receiving the user input, the REIV would request the local SRU to measure the user input against the validation data set 11.e. "SMALL|MEDIUM|LARGE" The result of the match would be sent to the script so that the script can decide the next action.

7. In case of a match found scenario, the script would request to play the confirmation prompt "I heard you say $VARIABLE$, say YES to confirm this"

8. In case of an incorrect match scenario, the script would play an error message prompt "That was an invalid input"+<repeat last prompt>.

9. After the entire transaction is done (the script gets a valid pizza size and confirmation or the user wants to go back to main menu), the respective return code is given to the remote end REIV stack to build a response VDC and send the response VDC back to the IVR.

10. On the IVR end, the waiting REIV stack would process this response VDC and send the response to the IVR for further processing.

The presently described method and apparatus providing remote end input validation provides several distinct advantages. The conventional model used as of today requires exchange of data/voice packets multiple times for a single dialog. This adds to the cost of transferring data multiple times and can often lead to congestion of the available bandwidth of the carrier. Embodiments of the present invention significantly cut down the iterations of data exchange between the IVR and end points leading to lesser costs and enhanced usage of the bandwidth. Additionally, the dependency on the common resources such as Speech Recognition Server, which are pooled on the IVR side, is reduced as the communication end point will utilize its own resources for such purposes.

The protocol can further be enhanced to have communication IDs (e.g. similar to session IDs over an HTTP connection). With this, the interaction between the IVR and communication end point does not have to be tied to a single continuous call. The interaction can follow a session oriented paradigm where the IVR can pose as a server entity and the communication end points will have its own compact voice browser that adhere to the proposed protocol. After a request VDC is sent to the caller, the IVR port can be released to process other call requests. After the request VDC is received, any available port could be assigned to the call request for further processing.

The request VDC and the response VDC can be encrypted to ensure secured voice communication. Customers can build a "common" grammar library. The library would contain grammars that are used very frequently. Such libraries can be uploaded on the remote end communication device, if it does not exist already. This will save bandwidth and improve the reusability. End users can download such grammars in offline mode as well (e.g., sync the handset with the Citibank IVR server) so as to speed up future communications.

Figure 3:
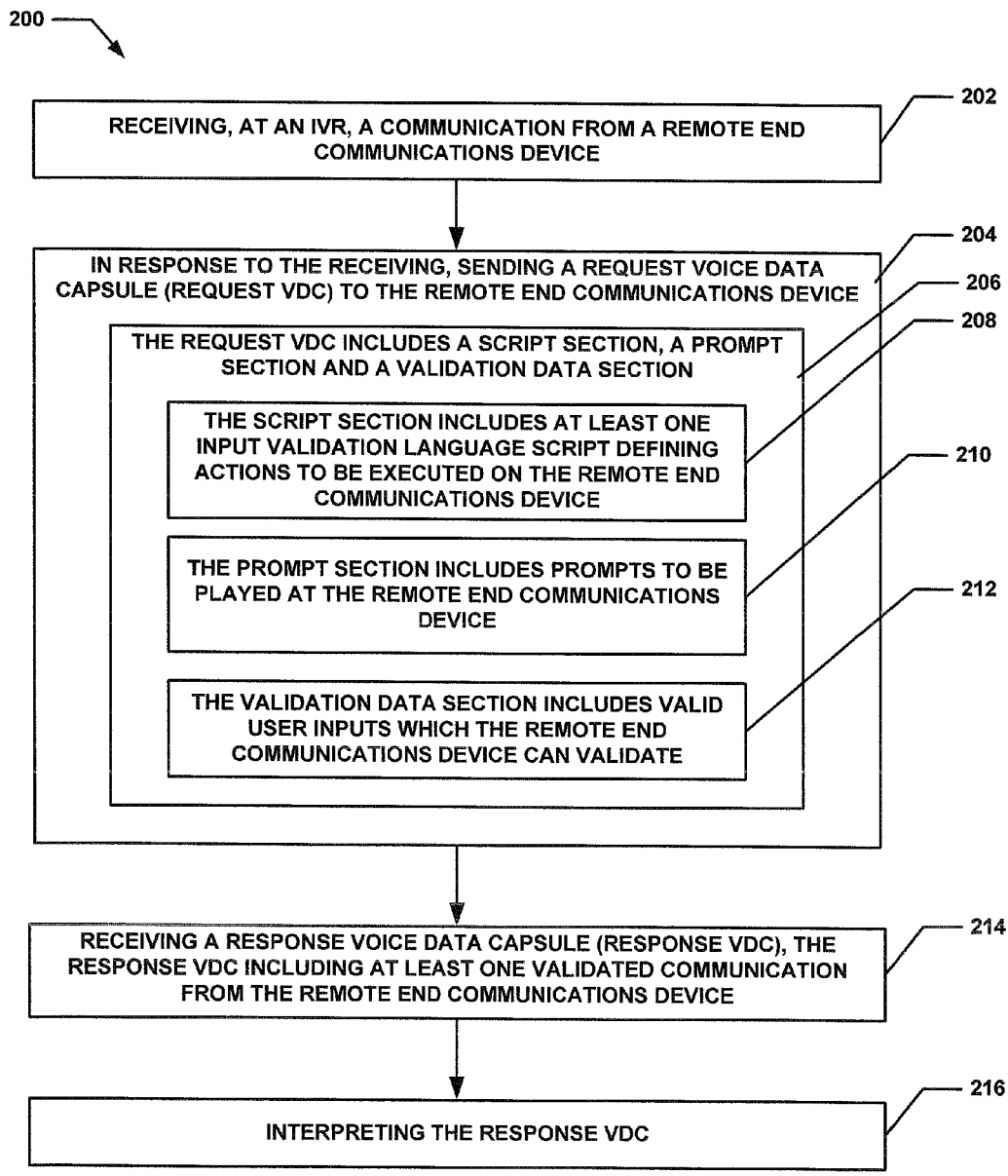
FIG. 3 depicts a flow diagram of a particular embodiment of a method of performing remote end input validation at an IVR in accordance with embodiments of the invention.
Figure 4:
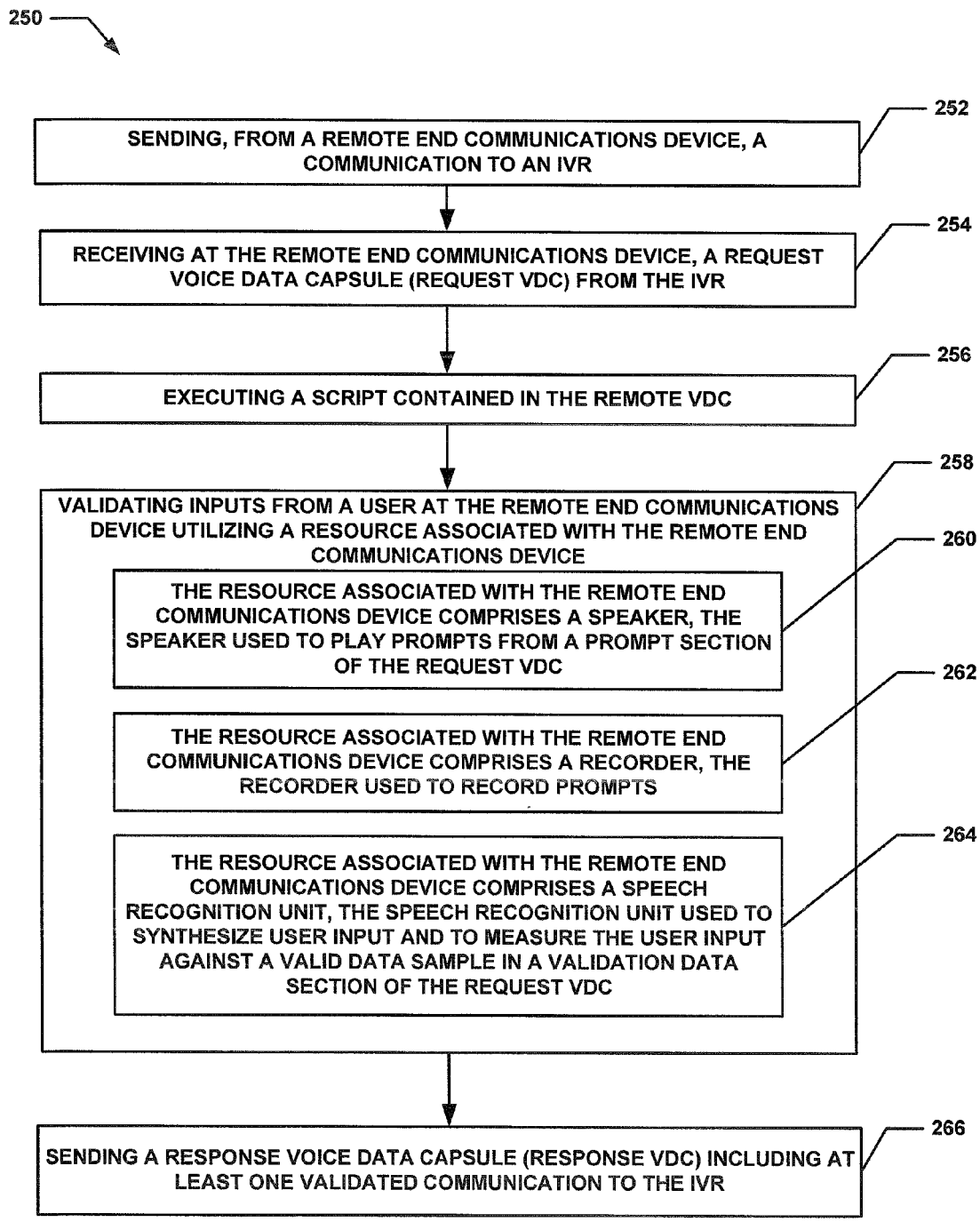
FIG. 4 depicts a flow diagram of a particular embodiment of a method of performing remote end input validation at a remote end device in accordance with embodiments of the invention.

Flow charts of particular embodiments of the presently disclosed methods are depicted in FIGS. 3 and 4. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 3 a flow diagram of a particular embodiment of a method 200 for performing remote end input validation at an IVR in accordance with embodiments of the invention is shown. The method begins with processing block 202, which discloses receiving, at an IVR, a communication from a remote end communications device.

Processing block 204 states in response to the receiving, sending a Request Voice Data Capsule (request VDC) to the remote end communications device. As shown in processing block 206 the Request VDC includes a script section, a prompt section and a validation data section. Processing block 208 states that the script section includes at least one input validation language script defining actions to be executed on the remote end communications device. Processing block 210 discloses that the prompt section includes prompts to be played at the remote end communications device. Processing block 212 states the validation data section includes valid user inputs that the remote end communications device can validate.

Processing continues with processing block 214, which recites receiving a Response Voice Data Capsule (response VDC), the response VDC including at least one validated communication from the remote end communications device. Processing block 216 discloses interpreting the response VDC.

Referring now to FIG. 4 a flow diagram of a particular embodiment of a method 250 of performing remote end input validation at a remote end device in accordance with embodiments of the invention is shown. Method 250 begins with processing block 252, which discloses sending, from a remote end communications device, a communication to an IVR.

Processing block 254 states receiving at the remote end communications device, a Request Voice Data Capsule (request VDC) from the IVR. Processing block 256 recites executing a script contained in the remote VDC.

Processing continues with processing block 258, which discloses validating inputs from a user at the remote end communications device utilizing a resource associated with the remote end communications device. As shown in processing block 260, the resource associated with the remote end communications device comprises a speaker, the speaker used to play prompts from a prompt section of the request VDC. As depicted in processing block 262 the resource associated with the remote end communications device comprises a recorder, the recorder used to record prompts. As recited in processing block 264 the resource associated with the remote end communications device comprises a speech recognition unit, the speech recognition unit used to synthesize user input and to measure the user input against a valid data sample in a validation data section of the request VDC.

Processing block 266 recites sending a Response Voice Data Capsule (response VDC) including at least one validated communication to the IVR.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method comprising:
  receiving, at an IVR, a communication from a remote end communications device;
  in response to said receiving, sending a Request Voice Data Capsule (request VDC) to said remote end communications device; and
  receiving a Response Voice Data Capsule (response VDC), said response VDC including at least one validated communication from said remote end communications device.

2. The method of claim 1 further comprising interpreting said response VDC.

3. The method of claim 1 wherein said Request VDC includes a script section, a prompt section and a validation data section.

4. The method of claim 3 wherein said script section includes at least one input validation language script defining actions to be executed on said remote end communications device.

5. The method of claim 3 wherein said prompt section includes prompts to be played at said remote end communications device.

6. The method of claim 3 wherein said validation data section includes valid user inputs which said remote end communications device can validate.

7. A method comprising:
  sending, from a remote end communications device, a communication to an IVR;
  receiving at said remote end communications device, a Request Voice Data Capsule (request VDC) from said IVR;
  executing a script contained in said remote VDC;
  validating inputs from a user at said remote end communications device utilizing a resource associated with said remote end communications device; and
  sending a Response Voice Data Capsule (response VDC) including at least one validated communication to said IVR.

8. The method of claim 7 wherein said resource associated with said remote end communications device comprises a speaker, said speaker used to play prompts from a prompt section of said request VDC.

9. The method of claim 7 wherein said resource associated with said remote end communications device comprises a recorder, said recorder used to record prompts.

10. The method of claim 7 wherein said resource associated with said remote end communications device comprises a speech recognition unit, said speech recognition unit used to synthesize user input and to measure said user input against a valid data sample in a validation data section of said request VDC.

11. A non-transitory computer readable medium having computer readable code thereon for providing remote end validation, the medium comprising:

instructions for receiving, at an IVR, a communication from a remote end communications device;

instructions for in response to said receiving, sending a Request Voice Data Capsule (request VDC) to said remote end communications device; and instructions for receiving a Response Voice Data Capsule (response VDC), said response VDC including at least one validated communication from said remote end communications device.

12. The computer readable medium of claim 11 further comprising instructions for interpreting said response VDC.

13. The computer readable medium of claim 11 wherein said Request VDC includes a script section, a prompt section and a validation data section.

14. The computer readable medium of claim 13 wherein said script section includes at least one input validation language script defining actions to be executed on said remote end communications device.

15. The computer readable medium of claim 13 wherein said prompt section includes prompts to be played at said remote end communications device.

16. The computer readable medium of claim 13 wherein said validation data section includes valid user inputs which said remote end communications device can validate.

17. A non-transitory computer readable medium having computer readable code thereon for providing remote end validation, the medium comprising:

instructions for sending, from a remote end communications device, a communication to an IVR;

instructions for receiving at said remote end communications device, a Request Voice Data Capsule (request VDC) from said IVR;

instructions for executing a script contained in said remote VDC;

instructions for validating inputs from a user at said remote end communications device utilizing a resource associated with said remote end communications device; and instructions for sending a Response Voice Data Capsule (response VDC) including at least one validated communication to said IVR.

18. The computer readable medium of claim 17 wherein said resource associated with said remote end communications device comprises a speaker, said speaker used to play prompts from a prompt section of said request VDC.

19. The computer readable medium of claim 17 wherein said resource associated with said remote end communications device comprises a speech recognition unit, said speech recognition unit used to synthesize user input and to measure said user input against a valid data sample in a validation data section of said request VDC.

20. A remote end communications device comprising:

a memory;

a processor;

a communications interface;

an interconnection mechanism coupling the memory, the processor and the communications interface; and wherein the memory is encoded with an application providing remote end validation, that when performed on the processor, provides a process for processing information, the process causing the computer system to perform the operations of:

sending a communication to an IVR;

receiving a Request Voice Data Capsule (request VDC) from said IVR;

executing a script contained in said remote VDC;

validating inputs from a user utilizing a resource associated with said remote end communications device; and sending a Response Voice Data Capsule (response VDC) including at least one validated communication to said IVR.

\* \* \* \* \*